US008624985B2

(12) United States Patent
Vinogradov et al.

(10) Patent No.: US 8,624,985 B2
(45) Date of Patent: Jan. 7, 2014

(54) APPARATUS FOR AND METHOD OF IMAGING TARGETS WITH WIDE ANGLE, ATHERMALIZED, ACHROMATIC, HYBRID IMAGING LENS ASSEMBLY

(75) Inventors: Igor Vinogradov, Oakdale, NY (US); Vladimir Gurevich, Stony Brook, NY (US); David Tsi-Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/298,701

(22) Filed: Nov. 17, 2011

(65) Prior Publication Data

US 2013/0128084 A1    May 23, 2013

(51) Int. Cl.
   H04N 5/228      (2006.01)
   H04N 9/07       (2006.01)
   H04N 9/04       (2006.01)

(52) U.S. Cl.
   USPC .................. 348/208.11; 348/260; 348/210.99

(58) Field of Classification Search
   USPC ......... 359/641, 644–648, 664, 719, 727, 728;
              348/96, 97, 99, 100, 209.99, 22, 106,
              348/201, 208.11, 210.99, 260, 264, 266;
              358/473, 474, 494, 496, 497, 505
   See application file for complete search history.

(56) References Cited

U.S. PATENT DOCUMENTS

| 5,202,795 A * | 4/1993 | Kashima ....................... 359/645 |
| 2004/0051957 A1 * | 3/2004 | Liang ............................ 359/656 |
| 2004/0056096 A1 | 3/2004 | Gurevich et al. |
| 2005/0200968 A1 * | 9/2005 | Nose et al. .................... 359/680 |
| 2005/0200972 A1 | 9/2005 | Nose et al. |
| 2005/0249458 A1 * | 11/2005 | Sasaki ............................ 385/24 |
| 2007/0217030 A1 * | 9/2007 | Muramatsu et al. .......... 359/708 |
| 2009/0086338 A1 * | 4/2009 | Epple ............................. 359/728 |
| 2009/0321618 A1 | 12/2009 | Ohara et al. |
| 2010/0110563 A1 | 5/2010 | Nakagawa |

FOREIGN PATENT DOCUMENTS

JP          9043508 A1      5/1997

OTHER PUBLICATIONS

International Search Report and Written Opinion dated Jan. 14, 2013 in counterpart patent application PCT/US2012/062651.

* cited by examiner

*Primary Examiner* — Lin Ye
*Assistant Examiner* — Euel Cowan
(74) *Attorney, Agent, or Firm* — Nong-Qiang Fan

(57) ABSTRACT

A wide angle, athermalized, achromatic, hybrid imaging lens assembly captures return light from a target over a field of view, and projects the captured return light onto an array of image sensors of a solid-state imager during electro-optical reading of the target. The assembly includes a plastic lens group for optical aberration compensation, a glass lens group spaced away from the plastic lens group along an optical axis, and an aperture stop between the lens groups and having an aperture through which the optical axis extends. The glass lens group has substantially all the optical power of the imaging lens assembly for thermal stability, and the plastic lens group has substantially no optical power. A holder holds the lenses and the aperture stop in front of the array.

20 Claims, 2 Drawing Sheets

APPARATUS FOR AND METHOD OF IMAGING TARGETS WITH WIDE ANGLE, ATHERMALIZED, ACHROMATIC, HYBRID IMAGING LENS ASSEMBLY

FIELD OF THE DISCLOSURE

The present disclosure relates generally to an apparatus for, and a method of, electro-optically reading targets by image capture and, more particularly, to a wide angle, athermalized, achromatic, hybrid imaging lens assembly for capturing return light from a target over a field of view of a solid-state imager of an imaging reader, and for projecting the captured return light onto the imager during reading of the target.

BACKGROUND

Solid-state imaging apparatus or imaging readers, that have been configured either as handheld, portable scanners and/or stand-mounted, stationary scanners each having a presentation window, or as vertical slot scanners each having a generally vertically arranged, upright window, or as flat-bed or horizontal slot scanners each having a generally horizontally arranged window, or as bi-optical, dual window scanners each having both generally horizontally and vertically arranged windows, have been used in many venues, such as supermarkets, department stores, and other kinds of retailers, libraries, parcel deliveries, as well as factories, warehouses and other kinds of industrial settings, for many years, in both handheld and hands-free modes of operation, to electro-optically read by image capture a plurality of symbol targets, such as one-dimensional symbols, particularly Universal Product Code (UPC) bar code symbols, and two-dimensional symbols, as well as non-symbol targets, such as driver's licenses, receipts, signatures, etc., the targets being associated with, or borne by, objects or products to be processed by the imaging readers. In the handheld mode, a user, such as an operator or a customer, held the imaging reader and manually aimed a window thereon at the target. In the hands-free mode, the user slid or swiped a product associated with, or bearing, the target in a moving direction across and past a respective window in a swipe mode, or momentarily presented the target associated with, or borne by, the product to an approximate central region of the respective window, and steadily momentarily held the target in front of the respective window, in a presentation mode. The choice depended on the type of the reader, or on the user's preference, or on the layout of the venue, or on the type of the product and target.

The imaging reader included a solid-state imager (also known as an imaging sensor) with a sensor array of photocells or light sensors (also known as pixels), which corresponded to image elements or pixels over a field of view of the imaging sensor, and an imaging lens assembly for capturing return light scattered and/or reflected from a target being imaged over a working range of distances, and for projecting the return light onto the imaging sensor to initiate capture of an image of the target as pixel data. The imaging sensor was configured as a one- or two-dimensional charge coupled device (CCD) or a complementary metal oxide semiconductor (CMOS) device, and included associated circuits for producing and processing an electrical signal corresponding to a one- or two-dimensional array of the pixel data over the field of view. The imaging sensor was controlled by a controller or programmed microprocessor that was operative for processing the electrical signal into data indicative of the target being imaged and, when the target was a symbol, for processing and decoding the symbol.

The known imaging lens assembly typically comprised a plurality of lenses of different sizes and optical powers, such as a classical Cooke triplet that allowed elimination of most of the optical distortion or color aberration at the outer edge of the lenses. The Cooke triplet typically comprised a negative flint glass lens in the center of the lens assembly with a crown glass lens on each side of the center lens. The lenses were held in a lens holder and axially arranged along an optical axis. An aperture stop having a rotationally symmetrical aperture, e.g., a circular aperture, or a non-rotationally symmetrical (or asymmetrical) aperture, e.g., a rectangular or elliptical aperture, centered on the optical axis, was typically located between one of the side glass lenses and the center glass lens. In the Cooke triplet, the sum of all the lens curvatures multiplied by the indices of refraction of the lenses was typically designed to be zero, so that the field of focus is flat (zero Petzval field curvature).

Traditionally, each lens of the Cooke triplet was made of glass for improved thermal stability, because glass has a relatively lower coefficient of thermal expansion and a relatively lower refractive index variation over temperature, as compared to plastic, for example. Hence, an all-glass lens design was typically used to minimize focal shift over an operating temperature range. To provide the known imaging lens assembly with a wide angle field of view, e.g., greater than 50 degrees, it was known to add a fourth glass spherical lens of negative optical power in front of the Cooke triplet. Sometimes, to improve the imaging performance, a fifth glass spherical lens was added.

However, the all-glass imaging lens design comprised of three, four, or five or more glass lenses was relatively heavy and expensive. It was possible to reduce the number of glass lenses by configuring aspherical surfaces on a respective glass lens. However, the manufacture of aspherical surfaces on glass lenses by machining and polishing was challenging and costly. Aspherical surfaces could be readily and inexpensively molded on a plastic lens, which was also lighter than a corresponding glass lens. Nevertheless, despite the lighter weight and lower fabrication cost of the plastic lens, the thermal instability and focal shift were unacceptable in many electro-optical reading applications. Full thermal stability and full color aberration correction were not simultaneously achieved.

Accordingly, it would be desirable to provide a compact, lightweight and inexpensive, imaging lens assembly of high thermal stability, with minimal optical distortion or color aberration, and with a wide angle field of view, especially useful in portable and mobile applications where size, weight and cost are at a premium.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
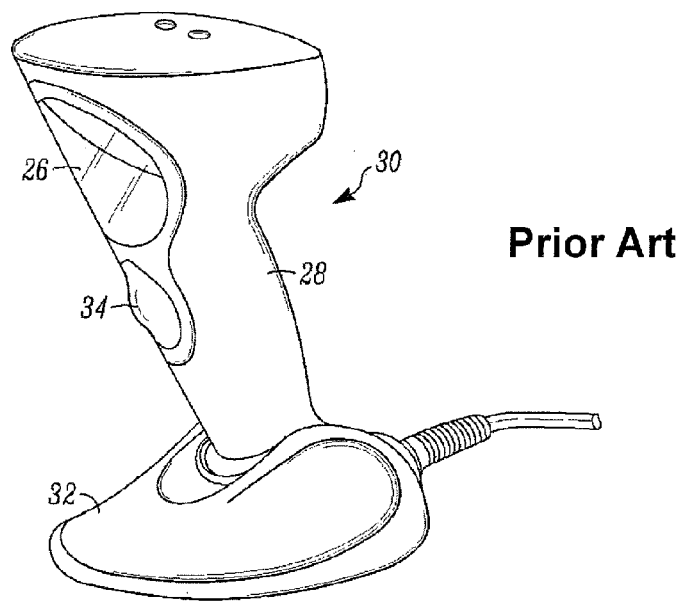
FIG. 1 is a perspective view of a portable imaging apparatus or reader operative in either a handheld mode, or a hands-free mode, for capturing return light from targets.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one feature of this invention, a hybrid imaging lens assembly captures return light from a target over a field of view of an array of image sensors of a solid-state imager, and projects the captured return light onto the array during electro-optical reading of the target. The assembly comprises a plastic lens group having substantially no optical power of the imaging lens assembly for optical aberration compensation, and a glass lens group spaced away from the plastic lens group along an optical axis and having substantially all the optical power of the imaging lens assembly for thermal stability. The assembly also comprises an aperture stop that is located between the lens groups and that has an aperture through which the optical axis extends. A holder holds the lens groups and the aperture stop in spaced relation along the optical axis relative to the array.

Preferably, the plastic lens group has a pair of plastic lenses spaced apart from each other along the optical axis. One of the plastic lenses has a negative optical power, and the other of the plastic lenses has a positive optical power. Each plastic lens has opposite aspherical surfaces. An aspherical surface on each plastic lens is convexly curved in a direction facing away from the array. The glass lens group has a pair of glass lenses. One of the glass lenses has a negative optical power, and the other of the glass lenses has a positive optical power. Each glass lens has a high index of refraction. One of the glass lenses has a curved surface that is convexly curved in a direction facing toward the array. The aperture stop is a discrete optical component separate from the holder and is in direct surface area contact with the lens groups.

This part-plastic, part-glass, hybrid lens design is compact and achieves the above-described dual advantages of glass and plastic in which the glass lens group provides, among other things, substantial thermal stability and substantial color aberration correction, and the plastic lens group provides, among other things, not only optical aberration compensation, a lighter weight, an easier and more cost efficient manufacture, but also enables aspherical surfaces to be readily integrated in the imaging lens assembly to reduce the number of lenses required and to widen the angle of the field of view. The aspherical surfaces on the plastic lenses increase the field of view angle without requiring an extra lens. By minimizing the combined optical power of the plastic lens group, and by providing substantially all the optical power of the imaging lens assembly only by the combined optical power of the glass lens group, the assembly is athermalized, and any color aberrations introduced by the plastic lens group is corrected by the glass lens group.

Turning now to the drawings, reference numeral 30 in FIG. 1 generally identifies an imaging apparatus or reader having a presentation area configured as a generally upright window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the window 26, or can be picked up off the countertop and held in an operator's hand and used in a handheld mode in which the reader is moved, and a trigger 34 is manually depressed to initiate imaging of a target, especially one- or two-dimensional symbols, to be read at a working distance from the window 26. In another variation, the base 32 can be omitted, and housings of other configurations can be employed. For example, the housing can be configured as a vertical slot scanner having a generally vertically arranged, upright window, or as a flat-bed or horizontal slot scanner having a generally horizontally arranged window, or as a bi-optical, dual window scanner having both generally horizontally and vertically arranged windows, A cable, as illustrated in FIG. 1, connected to the base 32 can also be omitted, in which case, the reader 30 communicates with a remote host by a wireless link, and the reader 30 is electrically powered by an on-board battery.

Figure 2:
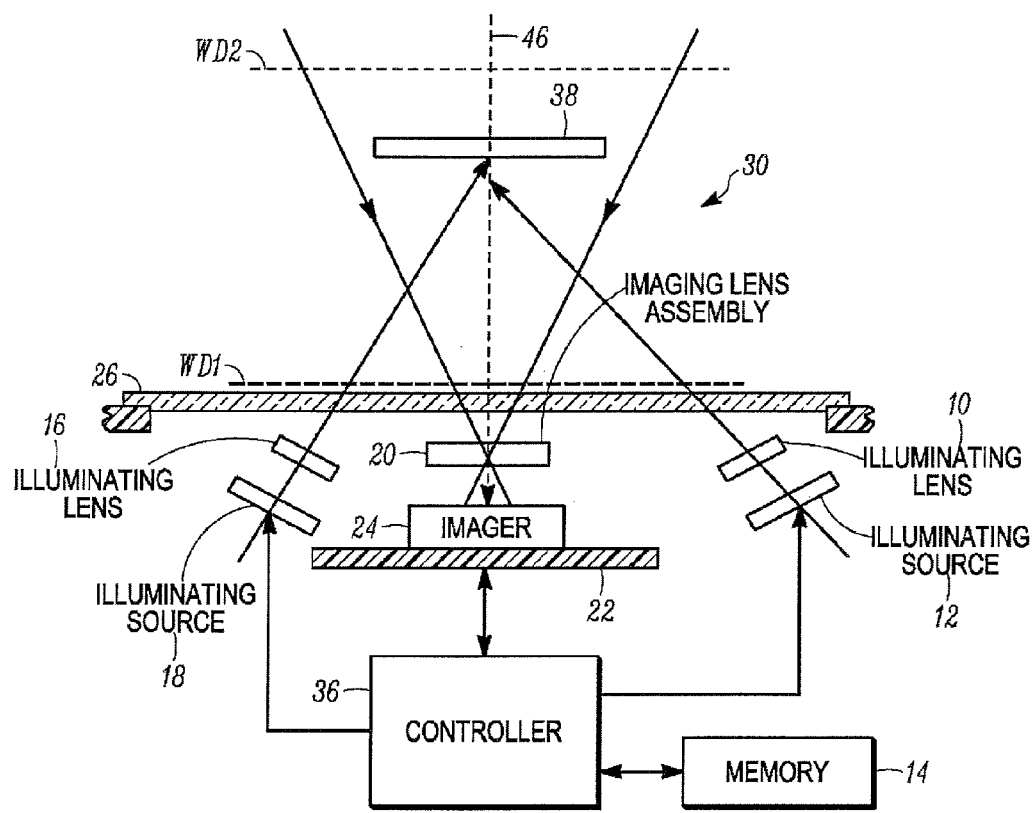
FIG. 2 is a schematic diagram of various components of the reader of FIG. 1.

As schematically shown in FIG. 2, an imager or imaging sensor 24 is mounted on a printed circuit board 22 in the reader. The imaging sensor 24 is a solid-state device, for example, a CCD or a CMOS imaging sensor having an array of addressable image sensors or pixels, preferably, but not necessarily, arranged in a single, linear, one-dimensional row along an array axis, and operative for detecting return light captured by an imaging lens assembly 20 along an optical path or optical axis 46 that extends through the window 26. The return light is scattered and/or reflected from a target or symbol 38 as pixel data over a field of view. The imaging lens assembly 20 is operative for focusing and projecting the return light onto the array of image sensors to enable the target 38 to be read. The target 38 is located anywhere in a range of working distances between a close-in working distance (WD1) and a far-out working distance (WD2). In a preferred embodiment, WD1 is about four to six inches from the imaging sensor 24, and WD2 can be many feet from the window 26, for example, around fifty feet away.

An illuminating assembly is also mounted in the imaging reader and preferably includes an illuminator or illuminating light sources 12, 18, e.g., light emitting diodes (LEDs), and corresponding illuminating lenses 10, 16 to uniformly illuminate the target 38 with an illuminating light having an intensity level over an illumination time period. The light sources 12, 18 are preferably pulsed.

As shown in FIG. 2, the imaging sensor 24 and the illuminating light sources 12, 18 are operatively connected to a controller or programmed microprocessor 36 operative for controlling the operation of these components. Preferably, the microprocessor 36 is operative for processing the return light from the target 38, and for decoding the captured target image when the target 38 is a symbol. A memory 14 is accessible by the controller 36 for storing and retrieving data.

In operation, the controller 36 sends a command signal to pulse the illuminating light sources 12, 18 for the illumination time period, say 500 microseconds or less, and energizes and exposes the imaging sensor 24 to collect light, e.g., illumination light and/or ambient light, from the target 38 during an exposure time period. A typical array needs about 16-33 milliseconds to acquire the entire target image and operates at a frame rate of about 30-60 frames per second.

Figure 3:
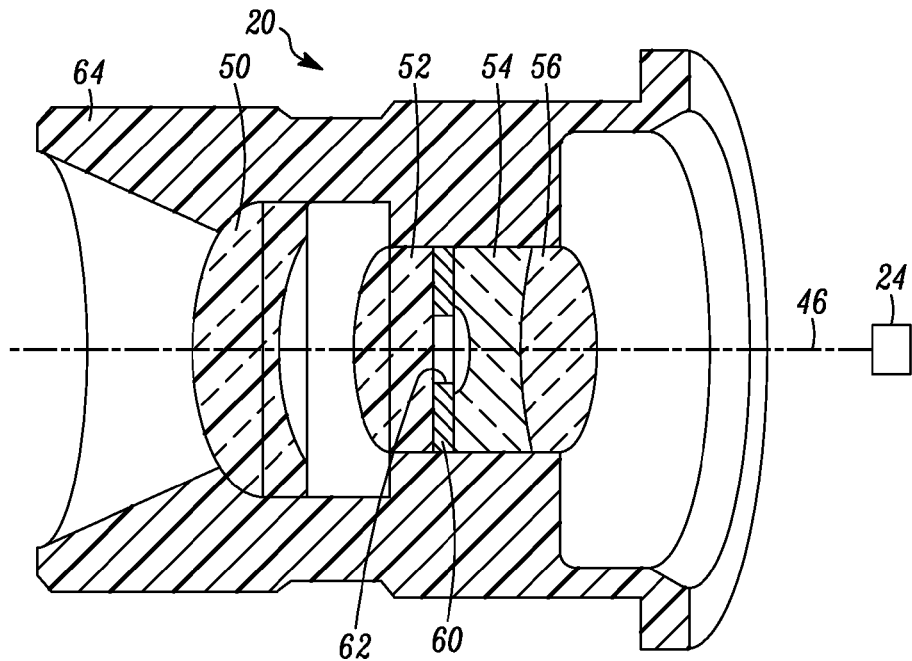
FIG. 3 is a part-sectional, part-isometric, cross-sectional view of an imaging lens assembly in accordance with this invention for use in the reader of FIG. 1.
Figure 4:
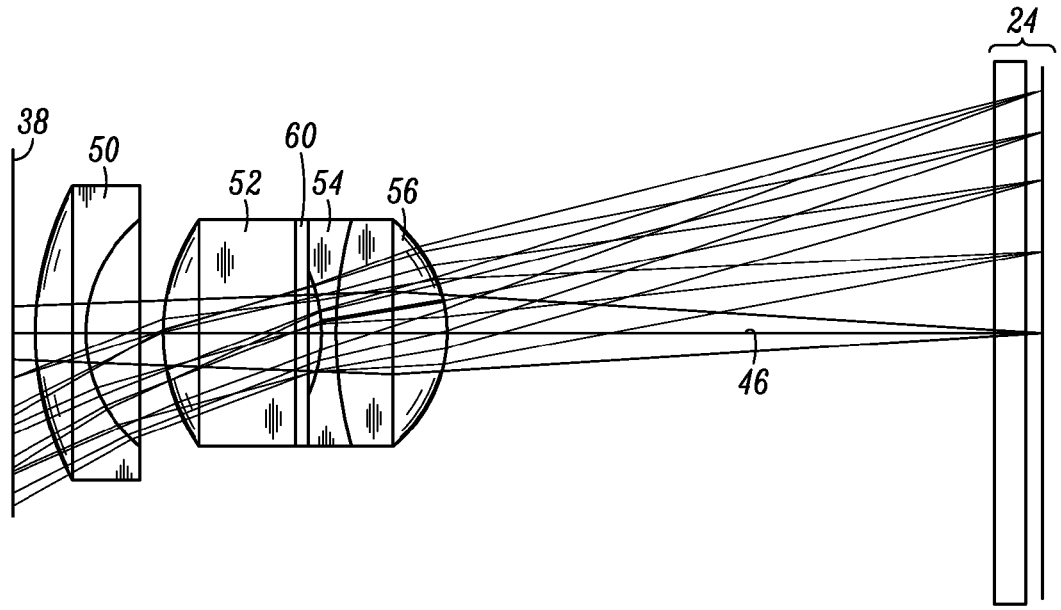
FIG. 4 is an enlarged, diagrammatic side elevational view of the imaging lens assembly of FIG. 3 depicting ray traces.

In accordance with one aspect of this invention, as shown in FIGS. 3-4, the imaging lens assembly 20 provided in the reader 30 is modified to be a compact, wide angle, athermalized, achromatic, hybrid lens assembly operative for capturing return illumination light through the window 26 from the target 38 over the field of view, and for projecting the captured return illumination light from the target 38 onto the imaging sensor 24 during electro-optical reading of the target 38. The hybrid assembly 20 includes a plastic lens group having substantially no optical power, and comprised of a pair of plastic lenses 50, 52. The hybrid assembly 20 also includes a glass lens group having substantially all the optical power of the imaging lens assembly, and comprised of a pair of glass lenses 54, 56. The glass lens group is spaced away from the plastic lens group along the optical axis 46. The hybrid assembly 20 also comprises an aperture stop 60 that is located between the lens groups and that has an aperture 62 through which the optical axis 46 extends. A tubular optical barrel or holder 64 holds the lens groups and the aperture stop 60 in axially spaced relation along the optical axis 46 relative to the imaging sensor 24.

The plastic lenses 50, 52 are spaced apart at an air gap or spacing, e.g., about 0.5 mm, from each other along the optical axis 46. The plastic lens 50 has a negative optical power, is constituted of a low dispersion (crown) plastic material, and has opposite aspherical surfaces, both of which are convexly curved in a direction facing away from the sensor 24. The plastic lens 50 also has a relatively high Abbe number, e.g., about 55. The Abbe number is a measure of the plastic lens material's dispersion (variation of refractive index with wavelength) in relation to its refractive index. The other plastic lens 52 has a positive optical power, is constituted of a high dispersion (flint) plastic material, and has opposite aspherical surfaces, at least one of which is convexly curved in a direction facing away from the sensor 24. The aspherical surface of the other plastic lens 52 located next to the aperture stop 60 can be used for wavefront modifications, extended depth of focus (EDOF) design like an axicon, negative spherical aberration, cubic mask, wavefront coding, etc. The closer the wavefront modifying surface is to the aperture stop 60, the more consistent the wavefront modification across the imaging field of view. The plastic lens 52 also has a relatively low Abbe number, e.g., about 25. The aspherical plastic lenses 50, 52 achieve a desired lens performance over a wide angle field of view. The aspherical plastic lenses 50, 52 are used for aberration compensation, for example, field curvature and distortion.

The glass lens 54 is axially spaced away from the plastic lens 52 along the optical axis 46, has a negative optical power, has a high index of refraction, e.g., preferably greater than 1.6, is constituted of a flint-type material, has a relatively low Abbe number, e.g., about 25, and has opposite spherical concave surfaces. The glass lens 56 has a positive optical power, has a high index of refraction, e.g., preferably greater than 1.6, is constituted of a crown-type material, and has a relatively high Abbe number, e.g., about 50. One surface of the glass lens 56, which is proximal to the glass lens 54, is generally planar. There may be an air gap between the lenses 54, 56. Preferably, there is no air gap, and the lenses 54, 56 are cemented together as a doublet. The opposite surface of the glass lens 56 is convexly curved in a direction facing towards the sensor 24. The lenses 54, 56 are used for thermal stability and color aberration compensation.

The aperture stop 60 may be configured as a discrete optical component, or may be integrally molded with the holder 64, or with the plastic lens 52. The aperture 62 may be asymmetrical, e.g., a rectangular or elliptical aperture, or symmetrical, e.g., circular. If the imaging sensor 24 is a linear sensor that extends along an array axis, and if the aperture is asymmetrical, then the aperture 62 needs to be aligned relative to the imaging sensor 24 such that the long dimension of the asymmetrical aperture extends along a direction generally perpendicular to the elongation (array axis) of the imaging sensor 24. There may be an air gap or spacing between the aperture stop 60 and either of the lenses 52, 54. Preferably, the aperture stop 60 is in direct surface contact with both the lenses 52, 54. The lenses 52, 54, 56, and 58 and the aperture stop 60 are all fixed in place, preferably with an adhesive bond, within the holder 64. The aperture stop 60 provides optimum compensation of aberrations (coma, astigmatism, distortion, etc.) since they tend to cancel each other. As a result, image distortion of less than 0.5% can be easily achieved. Image magnification stays nearly unchanged over the entire field of view on and off the optical axis 46. Another benefit is that the physical size or diameter of the lens groups can be minimized, thereby further reducing the overall weight and volume of the assembly 20.

This part-plastic, part-glass, hybrid lens design is compact and achieves the above-described dual advantages of glass and plastic in which the glass lens group provides, among other things, substantial thermal stability and substantial color aberration correction, and the plastic lens group provides, among other things, not only optical aberration compensation, a lighter weight, an easier and more cost efficient manufacture, but also enables aspherical surfaces to be readily integrated in the imaging lens assembly to reduce the number of lenses required and to widen the angle of the field of view. The aspherical surfaces on the plastic lenses increase the field of view angle without requiring an extra lens. By minimizing the combined optical power of the plastic lens group, and by providing substantially all the optical power of the imaging lens assembly 20 only by the combined optical power of the glass lens group, the assembly is athermalized, and any color aberrations introduced by the plastic lens group is corrected by the glass lens group. In the preferred embodiment, where the imaging sensor 24 has a diagonal size of about 6.4 mm, the imaging lens assembly 20 has an effective focal length of about 5 mm, an entrance pupil diameter of about 0.8 mm, an f number of about 6.25, and a diagonal field of view of about 65 degrees. The thermal variation of the back focal distance over a temperature range of from about −30 degrees Centigrade to about +70 degrees Centigrade is about +/−10 microns (0.2%).

It will be understood that each of the elements described above, or two or more together, also may find a useful application in other types of constructions differing from the types described above.

In accordance with another feature of this invention, a reader for electro-optically reading a target, comprises a housing having a presentation area, a solid-state imager in the housing and including an array of image sensors having a field of view, and the above-described hybrid imaging lens assembly, which is mounted in the housing. Still another feature of this invention resides in a method of capturing return light from a target over a field of view of an array of image sensors of a solid-state imager, and of projecting the captured return light onto the array during electro-optical reading of the target. This method is performed by compensating optical aberration with a plastic lens group having substantially no optical power, spacing a glass lens group having substantial optical power for thermal stability away from the plastic lens group along an optical axis, positioning an aperture stop having an aperture through which the optical axis extends between the lens groups, and holding the lens groups and the aperture stop in a holder in a spaced relation along the optical axis relative to the array.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A hybrid imaging lens assembly for capturing return light from a target over a field of view of an array of image sensors of a solid-state imager, and for projecting the captured return light onto the array during electro-optical reading of the target, the assembly comprising:
   a plastic lens group having substantially no optical power of the imaging lens assembly for optical aberration compensation;
   a glass lens group spaced away from the plastic lens group along an optical axis, the glass lens group having substantially all the optical power of the imaging lens assembly for thermal stability;
   an aperture stop between the lens groups and having an aperture through which the optical axis extends; and
   a holder for holding the lens groups and the aperture stop in spaced relation along the optical axis relative to the array
   wherein a thermal variation of a focal length of the glass lens group, over a temperature range of from about −30 degrees Centigrade to about +70 degrees Centigrade is less than 0.2% of the focal length.

2. The assembly of claim 1, wherein the plastic lens group has a pair of plastic lenses spaced apart from each other along the optical axis, wherein one of the plastic lenses has a negative optical power and is constituted of a low dispersion crown material, and wherein the other of the plastic lenses has a positive optical power and is constituted of a high dispersion flint material.

3. The assembly of claim 1, wherein the plastic lens group has a pair of plastic lenses spaced apart from each other along the optical axis, wherein each plastic lens has opposite aspherical surfaces to widen the field of view, and wherein an aspherical surface on each plastic lens is convexly curved in a direction facing away from the array.

4. The assembly of claim 1, wherein the aspherical surface of one of the plastic lenses located adjacent the aperture stop is configured for one of wavefront modification and extended depth of focus.

5. The assembly of claim 1, wherein the glass lens group has a pair of glass lenses, wherein one of the glass lenses has a negative optical power and is constituted of a flint material, and wherein the other of the glass lenses has a positive optical power and is constituted of a crown material.

6. The assembly of claim 1, wherein the glass lens group has a pair of glass lenses, wherein each glass lens has a high index of refraction, and wherein one of the glass lenses has a curved surface that is convexly curved in a direction facing toward the array.

7. The assembly of claim 1, wherein the aperture stop is a discrete optical component separate from the holder and is in direct surface area contact with the lens groups.

8. A reader for electro-optically reading a target, comprising:
 a housing having a presentation area;
  a solid-state imager in the housing and including an array of image sensors having a field of view; and
  a hybrid imaging lens assembly in the housing, for capturing return light over the field of view from the target through the presentation area, and for projecting the captured return light onto the array during electro-optical reading of the target, the assembly including a plastic lens group having substantially no optical power of the imaging lens assembly for optical aberration compensation, a glass lens group spaced away from the plastic lens group along an optical axis, the glass lens group having substantially all the optical power of the imaging lens assembly for thermal stability, an aperture stop between the lens groups and having an aperture through which the optical axis extends, and a holder for holding the lens groups and the aperture stop in spaced relation along the optical axis relative to the array;
  wherein a thermal variation of a focal length of the glass lens group over a temperature range of from about −30 degrees Centigrade to about +70 degrees Centigrade is less than 0.2% of the focal length.

9. The reader of claim 8, wherein the plastic lens group has a pair of plastic lenses spaced apart from each other along the optical axis, wherein one of the plastic lenses has a negative optical power and is constituted of a low dispersion crown material, and wherein the other of the plastic lenses has a positive optical power and is constituted of a high dispersion flint material.

10. The reader of claim 8, wherein the plastic lens group has a pair of plastic lenses spaced apart from each other along the optical axis, wherein each plastic lens has opposite aspherical surfaces to widen the field of view, and wherein an aspherical surface on each plastic lens is convexly curved in a direction facing away from the array.

11. The reader of claim 10, wherein the aspherical surface of one of the plastic lenses located adjacent the aperture stop is configured for one of wavefront modification and extended depth of focus.

12. The reader of claim 8, wherein the glass lens group has a pair of glass lenses, wherein one of the glass lenses has a negative optical power and is constituted of a flint material, and wherein the other of the glass lenses has a positive optical power and is constituted of a crown material.

13. The reader of claim 8, wherein the glass lens group has a pair of glass lenses, wherein each glass lens has a high index of refraction, and wherein one of the glass lenses has a curved surface that is convexly curved in a direction facing toward the array.

14. The reader of claim 8, wherein the aperture stop is a discrete optical component separate from the holder and is in direct surface area contact with the lens groups.

15. A method of capturing return light from a target over a field of view of an array of image sensors of a solid-state imager, and of projecting the captured return light onto the array during electro-optical reading of the target, the method comprising:
 compensating optical aberration with a plastic lens group having substantially no optical power;
 spacing a glass lens group having substantial optical power for thermal stability away from the plastic lens group along an optical axis;
 positioning an aperture stop having an aperture through which the optical axis extends between the lens groups; and
 holding the lens groups and the aperture stop in a holder in a spaced relation along the optical axis relative to the array;
 wherein a thermal variation of a focal length of the glass lens group over a temperature range of from about −30 degrees Centigrade to about +70 degrees Centigrade is less than 0.2% of the focal length.

16. The method of claim 15, and configuring the plastic lens group as a pair of plastic lenses spaced apart from each other along the optical axis, and configuring one of the plastic lenses of a low dispersion crown material with a negative optical power, and configuring the other of the plastic lenses of a high dispersion flint material with a positive optical power.

17. The method of claim 15, and configuring the plastic lens group as a pair of plastic lenses spaced apart from each other along the optical axis, and configuring each plastic lens with opposite aspherical surfaces to widen the field of view, and configuring an aspherical surface on each plastic lens to be convexly curved in a direction facing away from the array.

18. The method of claim 15, and configuring the glass lens group as a pair of glass lenses, and configuring one of the glass lenses of a flint material with a negative optical power, and configuring the other of the glass lenses of a crown material with a positive optical power.

19. The method of claim 15, and configuring the glass lens group as a pair of glass lenses, and configuring each glass lens with a high index of refraction, and configuring one of the glass lenses with a curved surface that is convexly curved in a direction facing toward the array.

20. The method of claim 15, and configuring the aperture stop as a discrete optical component that is in direct surface area contact with the lens groups.

\* \* \* \* \*